Nov. 4, 1969   G. M. I. THOREN ET AL   3,476,397
SEAL BETWEEN STATIONARY AND ROTARY PARTS
Filed Jan. 31, 1967   2 Sheets-Sheet 1

INVENTORS
Georg Melker Isidor Thorén
Lennart Viktor Samuel Lundahl
BY
Davis, Hoxie, Faithfull & Hapgood

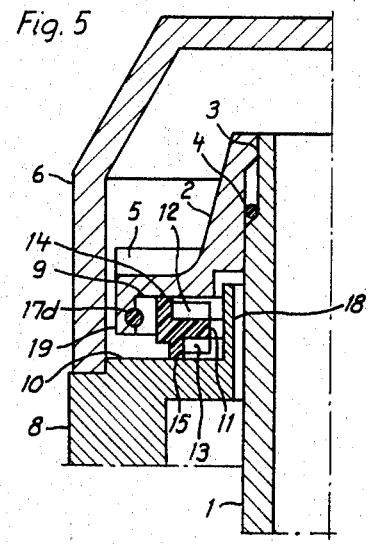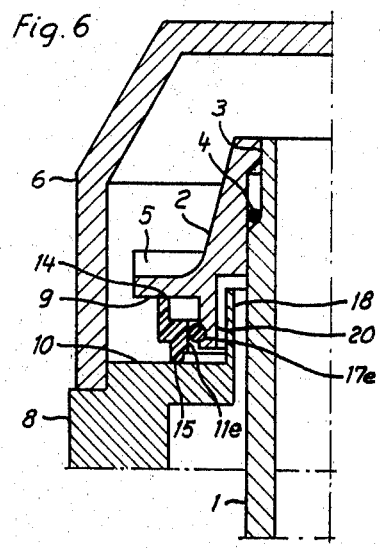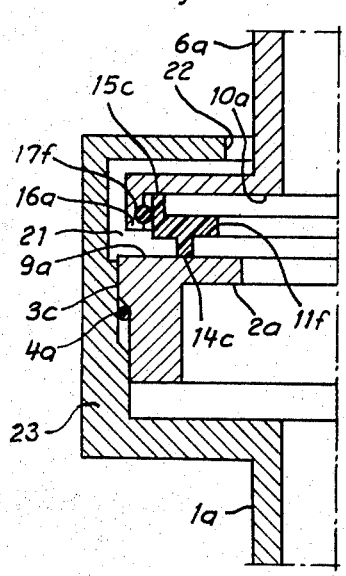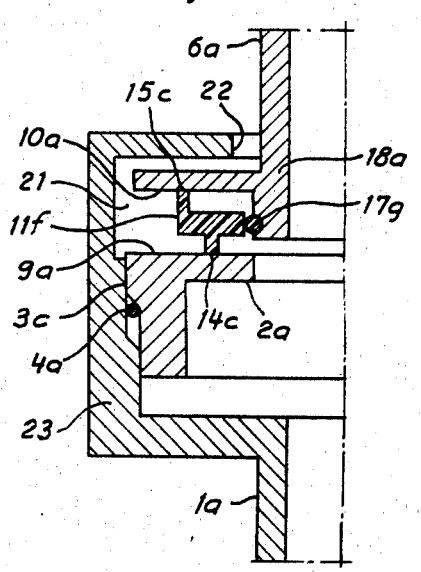

3,476,397
SEAL BETWEEN STATIONARY AND
ROTARY PARTS
Georg M. I. Thoren, Alvsjo, and Lennart V. S. Lundahl, Tumba, Sweden, assignors to Alfa-Laval AB, Tumba, Sweden, a corporation of Sweden
Filed Jan. 31, 1967, Ser. No. 612,991
Claims priority, application Sweden, Feb. 4, 1966, 1,435/66
Int. Cl. F16j 15/34, 15/54
U.S. Cl. 277—83          7 Claims

ABSTRACT OF THE DISCLOSURE

The stationary and rotary parts have respective plane annular sealing surfaces surrounding the axis of rotation and substantially perpendicular to that axis, and the sealing is effected by a ring disposed loosely between the sealing surfaces and movable in directions perpendicular to the rotation axis.

---

The present invention relates to a seal between stationary and rotary parts each having a plane annular sealing surface surrounding the axis of rotation and substantially perpendicular to the axis. Such seals are useful for various applications, such as for stirrer shafts which pass through the wall of a liquid container, for pump shafts, and for connecting rotary inlets and outlets of centrifuges to stationary pipelines.

One problem with such seals is that the sealing surfaces become worn so that the leakage between them increases in time. An object of the present invention is to provide an improved seal in which increasing leakage by wearing is avoided and in which, in a preferred embodiment, all leakage is avoided during operation.

According to the present invention, a sealing ring is loosely disposed between the aforesaid sealing surfaces and is movable in directions perpendicular to the axis of rotation. Thus, when the sealing ring is entrained by the rotating part, it will be thrown by the centrifugal force radially outward to one side and at the same time roll as a planet wheel along a circular course concentric to the axis of rotation. Consequently, the sealing ring travels repeatedly over different areas of the sealing surfaces of the stationary and the rotary parts, so that wearing concentrated at certain parts of the sealing surfaces is avoided. Also, the sealing surfaces are repeatedly coated by new liquid so as to ensure good lubrication of these surfaces by the liquid.

According to a preferred embodiment of the invention, the sealing surfaces are arranged at the outside of the rotary part. This embodiment has the advantage that liquid leaking from outside and radially inward is entrained in the rotation of the sealing ring and, by the resulting centrifugal force, is again forced outward, so that no leakage liquid leaves the sealing space during operation. The sealing ring under these conditions will more or less float on a liquid film at each sealing surface. The entraining of the leakage liquid in the rotation may be facilitated by providing the inside of the sealing ring with entraining vanes directed radially inward.

In order to ensure that the sealing ring maintains a close contact with the sealing surfaces during operation, the sealing surface of one part is preferably movable in the direction of the axis of rotation. The contact may be further improved by making the sealing surface of one part tiltable about a point on the axis of rotation.

When one of the sealing surfaces is movable axially as described above, the sealing surfaces can be maintained against the sealing ring by means of a spring pressing in the direction of the axis of rotation. However, it is preferred to operate without a spring, as this has the advantage that the sealing pressure and consequently the wearing are practically zero when the seal is not loaded by liquid. Thus, the machine embodying the seal can be started without liquid supply and without risk due to absence of lubrication; and as soon as liquid is supplied, the axially movable sealing surface is pressed by the liquid pressure against the sealing ring which in turn is pressed against the other sealing surface, so that the desired sealing is attained.

It has been mentioned in the foregoing that the sealing ring can roll as a planet wheel. This rolling movement is facilitated if the sealing ring is movable within a space having a larger outer diameter than that of the sealing ring, and a ring of rubber or plastic is inserted in the peripheral wall of this space or in the outer periphery of the sealing ring.

The seal according to the invention can be used to particular advantage in centrifugal separators, where it can be inserted between a rotary inlet or outlet of the rotor and a stationary pipeline.

The invention is described more in detail in the following, reference being made to the accompanying drawings in which:

FIGS. 4 through 8 are vertical sectional views of the left-hand part of other embodiments of the seal according to the invention.

In the different figures, corresponding parts have the same reference numerals.

Figure 1:
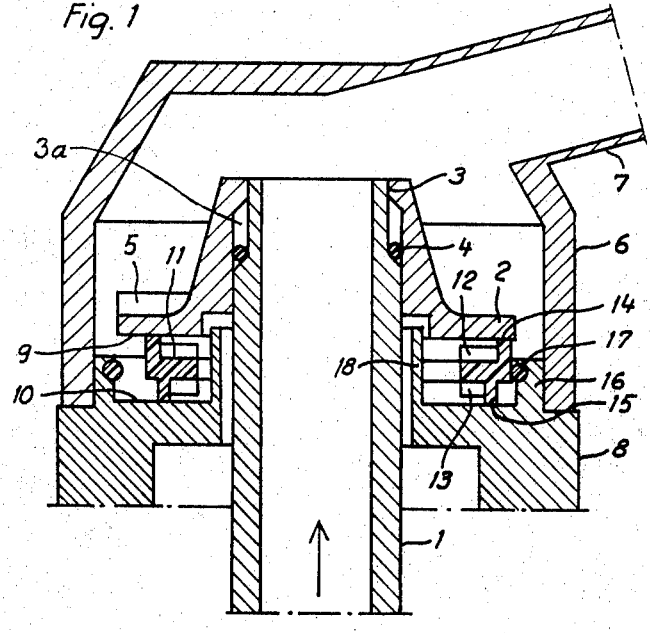
FIG. 1 is a vertical sectional view of one form of the new seal at the upper portion of a centrifuge.

In FIG. 1, reference numeral 1 designates the rotary outlet pipe of a centrifugal rotor. Through this pipe, liquid treated in the rotor discharges in the direction of the arrow. A disc 2 is mounted on the upper end portion of the pipe 1, where it is movable vertically. The vertical movements of disc 2 are guided by internal projections 3 on the disc which have close sliding fits in vertical grooves 3a in the outside of pipe 1, whereby the disc rotates with the pipe. Directly below the grooves 3a is an annular space between the pipe 1 and the disc 2, and a rubber ring 4 is inserted in this space to prevent leakage of liquid in the downward direction. Radially directed vanes 5 are provided on the upper side of the disc 2, and their pumping effect increases the liquid pressure acting in the downward direction on the disc 2. The liquid discharging from the pipe 1 is led off through a stationary housing 6 and a pipeline 7. The housing 6 is carried by the centrifuge frame 8, which also is stationary. The disc 2 has on its underside a plane annular sealing surface 9 and is tiltable about the axis of rotation due to a small play (not shown) between the opposing surfaces of the pipe 1 and the disc 2, or due to such play in combination with convexity of a contacting surface on the pipe. Also, the upper side of the centrifuge frame has a plane annular sealing surface 10.

A sealing ring 11 of hard rubber or hard plastic is loosely disposed between the sealing surfaces 9 and 10. This ring has a plurality of vanes 12 and 13 directed radially. Furthermore, the ring has an upper sealing surface 14 of larger outer diameter than a lower sealing surface 15. The centrifuge frame 8 has an annular, upwardly extending outer part 16, a ring 17 of rubber or plastic being inserted in a groove in the inner periphery of outer part 16. Frame 8 also has an inner annular part 18.

Figure 2:
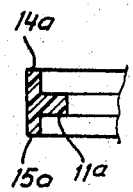
FIG. 2 is a cross section through the left-hand part of a modified sealing ring.

As shown in FIG. 2, the modified sealing ring 11a has sealing surfaces 14a and 15a with the same outer diameter.

Figure 3:
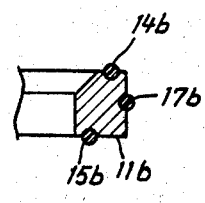
FIG. 3 is a cross section through the right-hand part of another modified sealing ring.

Another modification 11b of the sealing ring is shown in FIG. 3. It is manufactured of metal and has sealing surfaces 14b and 15b in the form of rings of rubber or similar material, which are inserted in grooves in the ring 11b and have different diameters. An additional ring 17b is inserted in a groove at the outside of the ring 11b, this additional ring having the same purpose as the ring 17 in FIG. 1.

Figure 4:
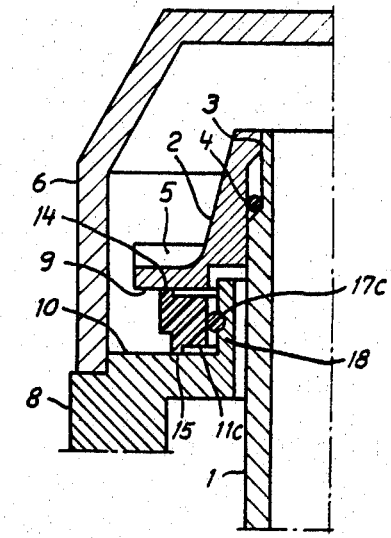

The part 16 and the ring 17 are omitted in the embodiment according to FIG. 4, and instead of the ring 17 a ring 17c of rubber or plastic is inserted in a groove in the outside of the part 18.

In the embodiment according to FIG. 5, the part 16 is replaced by an annular part 19 extending downward from the rotary disc 2, a ring 17d of rubber or plastic (corresponding to the ring 17 in FIG. 1) being inserted in a groove in the inside of the part 19.

In the embodiment according to FIG. 6, the part 16 is replaced by an annular part 20 arranged inside the ring 11e and extending downward from the rotary disc 2, a ring 17e of rubber or plastic (corresponding to the ring 17 in FIG. 1) being inserted in a groove in the outside of the part 20.

In the operation of the device shown in FIG. 1, the centrifugal rotor can be started without feeding liquid to it, whereby the outlet pipe 1 rotates about its vertical axis without discharging any liquid. The ring 11 is then either resting on stationary surface 10 or rotating with the disc surface 9. When liquid is supplied to the centrifuge, the housing 6 is filled with separated liquid from pipe 1. The separated liquid discharges through the pipe 7 and, particularly under the influence of the pump vanes 5, places the disc 2 under liquid pressure. As a result, the downward force exerted by the rotating surface 9 against the ring surface 14 is increased; and since the latter surface 14 has a greater diameter than the ring's lower surface 15 which engages stationary surface 10, the ring 11 is entrained in the rotation of the disc 2. As previously mentioned, the ring will at the same time travel as a planet wheel around the axis of rotation. More exactly, the ring 11 rolls along the inside of the ring 17, the latter serving to protect against a cutting contact between the ring 11 and the part 16. The planetary movement ensures formation and maintenance of a liquid film on the parts of surfaces 9 and 10 which are contacted by the ring 11. Liquid leaking into the space within the ring 11 is immediately forced radially outward by the rotating vanes 12 and 13, so that in practice the seal will be completely free of leakage during operation. Only at the start, before liquid pressure has developed against the disc 2, is it possible for a small amount of liquid to leak beyond the upper edge of the part 18.

In the embodiment according to FIG. 2, the upper and lower surfaces 14a and 15a have the same radius and hence the same moment arm, so that the ring 11a will slide between surfaces 9 and 10 during the rotation.

If the ring 11b shown in FIG. 3 is utilized in the embodiment according to FIG. 1, it will be entrained by the disc 2 in the rotation of the latter and will roll with the ring 17b as a planet wheel along the inside of the part 16, the ring 17 in FIG. 1 being omitted in this case.

In the embodiment according to FIG. 4, the ring 11c is also entrained by the rotating disc 2 and will roll with its inside along the outside of the ring 17c.

In the embodiment according to FIG. 5, the ring 11 is entrained by the rotating disc 2 but will at the same time roll along the inside of the ring 17d in spite of the fact that the latter has the same speed of rotation as the disc 2.

In the embodiment according to FIG. 6, the same is true as in the preceding embodiments, but here the ring 11e rolls against the outside of the ring 17e.

Referring to FIGS. 7 and 8, they show embodiments in which the stationary part extends into the rotary part, which is the reverse of the condition shown in the preceding figures.

As shown in FIGS. 7 and 8, the outlet pipe 1a of the centrifugal rotor has an enlargement 23 containing the annular disc 2a. The latter has external projections 3c slidable in vertical grooves in the surrounding wall of enlargement 23, whereby the disc 2a is movable vertically but rotates with pipe 1a. A sealing ring 4a fits closely in an annular space between disc 2a and the pipe enlargement 23. A stationary discharge pipe 6a extends into enlargement 23 through its top, the latter surrounding this pipe with a clearance to form an annular overflow outlet 22. Pipe 6a is flanged outwardly at its lower portion to form a stationary surface 10a opposing the rotary upper surface 9a of disc 2a; and sealing ring 11f is interposed between these surfaces. The ring 11f surrounds the rotation axis and has lower and upper annular surfaces 14c and 15c engaging the surfaces 9a and 10a, respectively. Liquid separated in the rotor discharges through pipe 1a, the central openings in disc 2a and ring 11f, and stationary pipe 6a; and the upward pressure exerted by the discharging liquid against disc 2a serves to press its rotary surface 9a against the sealing ring 11f, causing the latter to rotate with the disc.

In the FIG. 7 embodiment, the ring 11f rolls along the inside of a ring 17f secured to a surrounding wall 16a of the stationary pipe 6a; while in the FIG. 8 embodiment, the ring 11f rolls along the outside of a ring 17g secured to the lower part 18a of pipe 6a. In both the FIG. 7 and FIG. 8 embodiments, the sealing ring 11f is unable to pump back liquid which has leaked outwardly past the sealing surfaces 14c and 15c; but such liquid is collected in an annular space 21 outside ring 11f where it is placed under pressure by the centrifugal force. This pressure effects lubrication of the ring 11f from the outside as well and counteracts possible leakage through the overflow outlet 22. Due to the throttling effect of the ring 11f, the liquid pressure in space 21 will never be so great as to prevent the ring from being pressed firmly against rotating disc 2a, whereby the ring is entrained by the disc in its rotation.

We claim:

1. In combination with a stationary part and a rotary part each having a plane annular sealing surface surrounding the rotation axis of the rotary part and substantially perpendicular to said axis, a sealing ring loosely disposed between said sealing surfaces and movable in directions perpendicular to said axis while engaging said surfaces, the sealing ring having two annular sealing surfaces forming surfaces of contact between the ring and said sealing surfaces of the stationary and rotary parts, respectively, one of said surfaces of contact having a larger outer diameter than the other surface of contact.

2. The combination according to claim 1, in which said sealing surfaces are located outside the rotary part.

3. The combination according to claim 1, comprising also an annular wall surrounding the sealing ring and enclosing a space having a larger diameter than that of the ring, the ring being movable in said space in said perpendicular directions, and a rubber-like ring interposed between said wall and sealing ring.

4. The combination according to claim 1, in which said sealing surface of the rotary part is movable in the direction of said rotation axis.

5. The combination according to claim 1, in which said sealing surface of the rotary part is tiltable about a point on said rotation axis.

6. The combination according to claim 1, comprising also entraining vanes disposed on the inside of the sealing ring and directed radially inward therefrom.

7. The combination according to claim 1, comprising also pipes connected, respectively, to said stationary and rotary parts.

References Cited

UNITED STATES PATENTS 2,586,739   2/1952   Summers _____ 277—83

SAMUEL ROTHBERG, Primary Examiner

U.S. Cl. X.R.

277—133